United States Patent
Baca

(10) Patent No.: US 7,137,612 B2
(45) Date of Patent: Nov. 21, 2006

(54) HIGH RECOVERY METERING VALVE

(75) Inventor: Albert Baca, Long Beach, CA (US)

(73) Assignee: Whittaker Corporation, Simi Valley, CA (US)

( * ) Notice: Subject to any disclaimer, the term of this patent is extended or adjusted under 35 U.S.C. 154(b) by 0 days.

(21) Appl. No.: 10/931,512

(22) Filed: Sep. 1, 2004

(65) Prior Publication Data
US 2005/0104022 A1    May 19, 2005

Related U.S. Application Data

(60) Provisional application No. 60/500,105, filed on Sep. 4, 2003.

(51) Int. Cl.
*F16K 47/00* (2006.01)
(52) U.S. Cl. ..................................... 251/122
(58) Field of Classification Search ................ 251/122
See application file for complete search history.

(56) References Cited

U.S. PATENT DOCUMENTS

| | | | | |
|---|---|---|---|---|
| 2,114,858 A | * | 4/1938 | Rosch | 251/122 |
| 3,317,184 A | * | 5/1967 | Usry | 251/122 |
| 3,458,170 A | * | 7/1969 | Vogeli | 251/122 |
| 5,368,273 A | | 11/1994 | Dante | |
| 5,967,164 A | * | 10/1999 | Denda et al. | 137/1 |
| 5,988,202 A | | 11/1999 | Spitzer | |

FOREIGN PATENT DOCUMENTS

| | | |
|---|---|---|
| DE | 14 51 989 B | 6/1970 |
| DE | 19 40 941 A | 2/1971 |
| EP | 0 079 147 A | 5/1983 |
| EP | 1 092 834 A | 4/2001 |
| FR | 2 106 896 A | 5/1972 |

OTHER PUBLICATIONS

European Search Report for Application No. 04020985.0 (the European counterpart of the parent application) mailed on Sep. 28, 2004.

* cited by examiner

*Primary Examiner*—J. Casimer Jacyna
(74) *Attorney, Agent, or Firm*—Knobbe, Martens, Olson & Bear, LLP.

(57) ABSTRACT

A high recovery metering valve includes an inlet, outlet and a plenum. An internal valve trim places the plenum in communication with the outlet. A valve poppet is moveably positioned within the internal valve trim. In one embodiment, the valve poppet includes a distal portion that is tapered. In another embodiment, the distal portion is characterized by a double radius. In some embodiments the inlet and the outlet are orientated about ninety degrees with respect to each other.

17 Claims, 12 Drawing Sheets

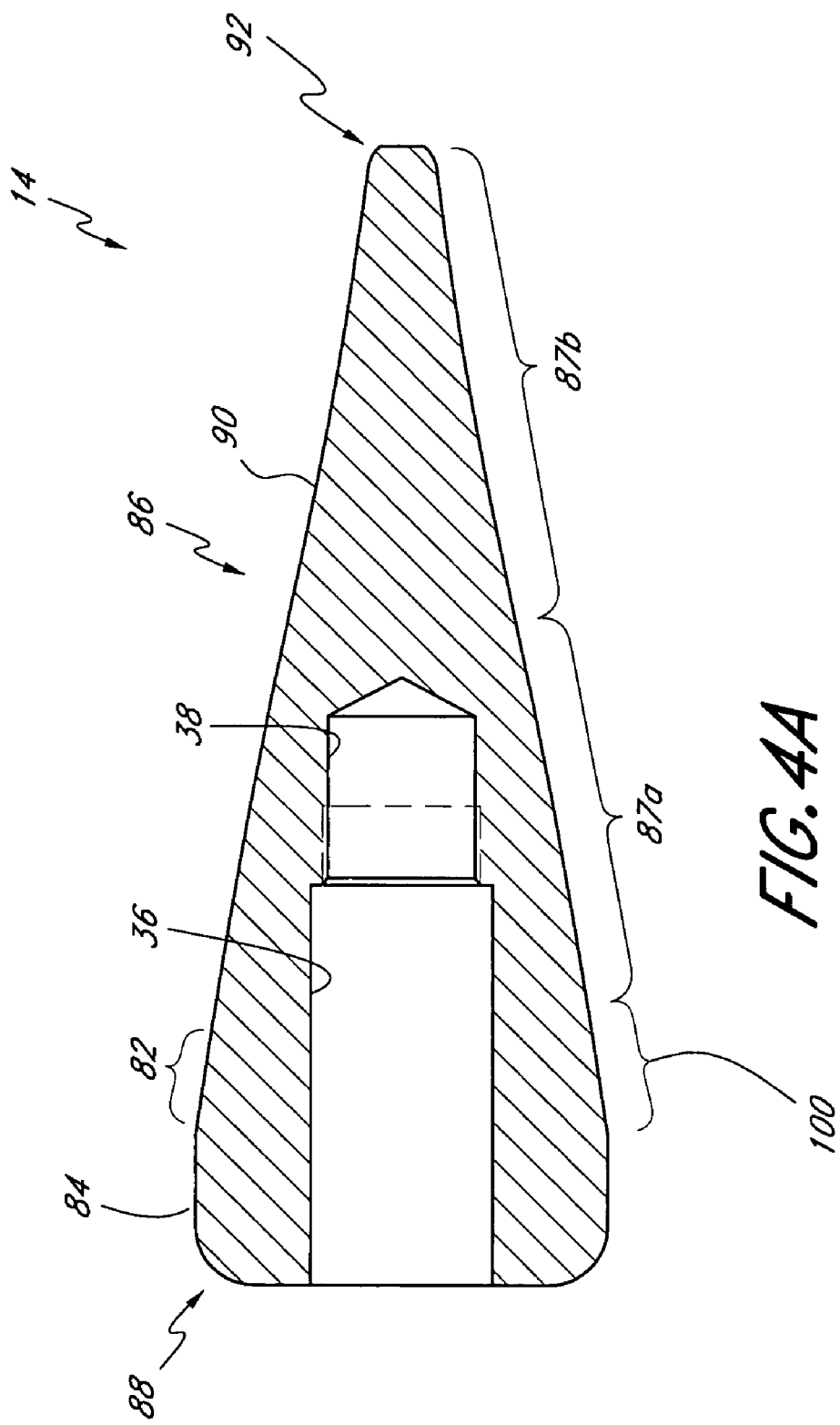

HIGH RECOVERY METERING VALVE

PRIORITY INFORMATION

This application claims the priority benefit under 35 U.S.C. § 119(e) of Provisional Application 60/500,105 filed Sep. 4, 2003.

BACKGROUND OF THE INVENTION

1. Field of the Invention

The present invention relates to control valves and, in particular, to metering valves.

2. Description of the Related Art

Fluid valves are well known mechanisms that are used to control the flow of a fluid (e.g., gas or liquid) through a conduit. A metering valve is a type of valve that provides precise control of the amount of fluid flowing through a conduit. Metering valves are used in a wide variety of industrial applications in which precise control is desired.

One particular application for a metering valve is in the power industry. For example, metering valves are used to control the amount of fuel (e.g., natural gas) that is delivered to the combustion chamber of a gas turbine. To meet stringent pollution emissions, it has become increasingly desirable to precisely control of the amount of fuel entering the combustion chamber.

To further reduce pollutants and to increase efficiency, it is generally desirable to operate the combustion chamber at high pressures. However, the operating pressure of the combustion chamber may be limited by the available supply pressure of the fuel supplied to the combustion chamber. The supply pressure may be increased by replacing and/or adding additional compressors to raise the supply pressure. Alternatively and typically less expensive, the supply pressure can be increased by reducing the pressure loss through the metering valve. Such pressure loss is often referred to as pressure recovery and is determined by the ratio of the total pressure at the inlet of the valve over the total pressure measured at the outlet of the valve.

One type of metering valve is an angle metering valve. Such angle valves have an inlet and an outlet that have longitudinal axes that are not parallel to each other. The angle between the longitudinal axes are often determined by the position of existing conduits and/or space limitations. Ninety degrees is a common angle in angle valves. Turning the direction of the fluid through an angle valve typically results in decreased pressure recovery.

There is, therefore, a general need for an improved high recovery metering valve.

SUMMARY OF THE INVENTION

The present invention provides for several novel designs for a metering valve, which provide for increased pressure recovery as compared conventional designs. In one preferred embodiment, a valve includes a valve body that comprises an inlet passage that forms an inlet port, an outlet passage that forms an outlet port, and a plenum. An internal valve trim has an inner surface that defines an internal passage for connecting the plenum to the outlet port. The inner surface includes a first surface that defines a valve seat and an opening having an average diameter. A valve poppet is moveably positioned at least partially within the internal passage. The valve poppet includes an outer surface that includes a complementary surface for mating with the valve seat and substantially closing the internal passage when the valve is in a closed position. The outer surface of the valve poppet further includes a distal portion located downstream of the complementary surface. The distal portion tapers from a first section having a first cross-sectional area to a second section having a second cross-sectional area. The second cross-sectional area being less than 25% of the first cross-sectional area and the second section being located a distance that is at least twice the average diameter of the opening downstream of the first section.

In another embodiment, a valve comprises a valve body that includes an inlet passage that forms an inlet port, an outlet passage that forms an outlet port, and a plenum in fluid communication with the inlet and outlet port. The inlet port defines a first longitudinal axis and the outlet port defines a second longitudinal axis. The inlet port has a cross-sectional area and the plenum has a maximum cross-sectional area in a plane perpendicular to the first longitudinal axis that is at least 10 times greater than the cross-sectional area of the inlet port. An internal valve trim defines an inner surface that defines an internal passage for connecting the plenum to the outlet port. The inner surface includes a first surface that defines a valve seat. A valve poppet is moveably positioned at least partially within the internal passage. The valve poppet includes an outer surface that includes a complementary surface for mating with the valve seat and substantially closing the internal passage when the valve is in a closed position. The outer surface of the valve poppet further includes a distal portion located downstream of the complementary surface and having a generally tapered shape.

In another embodiment, a power system comprises a gas turbine having an combustion chamber and a gas supply system for supplying gas to the gas turbine. The gas supply system includes at least one metering valve. The metering valve comprises a valve body that includes an inlet passage that forms an inlet port, an outlet passage that forms an outlet port, and a plenum in fluid communication with the inlet and outlet port. The inlet port defines a first longitudinal axis and the outlet port defines a second longitudinal axis. The first and second longitudinal axes are orientated about ninety degrees with respect to each other. An internal valve trim defines an inner surface that defines an internal passage for connecting the plenum to the outlet port. The inner surface includes a first surface that defines a valve seat. A valve poppet is moveably positioned at least partially within the internal passage. The valve poppet including an outer surface that includes a complementary surface for mating with the valve seat and substantially closing the internal passage when the valve is in a closed position. The outer surface of the valve poppet further includes a distal portion located downstream of the complementary surface and having a generally tapered shape. The valve is configured to provide a pressure recovery of 1.06 over a majority of the valve poppet stroke.

In another embodiment, a valve comprises a valve body that includes an inlet passage that forms an inlet port, an outlet passage that forms an outlet port, and a plenum in fluid communication with the inlet and outlet port. The inlet port defines a first longitudinal axis and the outlet port defines a second longitudinal axis that is orientated about ninety degrees with respect to the first longitudinal axis. An internal valve trim defines an inner surface that defines an internal passage for connecting the plenum to the outlet port. The inner surface includes a first surface that defines a valve seat and a second surface for defining a diffuser. The second surface is curved along a longitudinal axis of the internal passage and is concave with respect to the longitudinal axis of the internal passage. A valve poppet is moveably positioned at least partially within the internal passage. The valve poppet includes an outer surface that includes a complementary surface for mating with the valve seat and substantially closing the internal passage when the valve is in a closed position. The outer surface of the valve poppet further includes a distal portion located downstream of the complementary surface and has a generally tapered shape.

BRIEF DESCRIPTION OF THE DRAWINGS

FIG. 4A is a cross-sectional side view of the valve poppet of FIG. 2.

DETAILED DESCRIPTION OF PREFERRED EMBODIMENTS

One embodiment of the present invention provides a high recovery metering valve with a novel physical configuration. As will be described below, one embodiment reduces flow separation from diffuser walls, prevents or reduces flow interruptions by use of appropriate radii, minimizes or reduces abrupt contraction and expansion losses, has a high ratio of a plenum cross-sectional area to an inlet port cross-sectional area, and provides a relatively large inlet radii. One example embodiment advantageously, provide a pressure recovery of about 1.06 over a majority of a poppet stroke.

Figure 1:
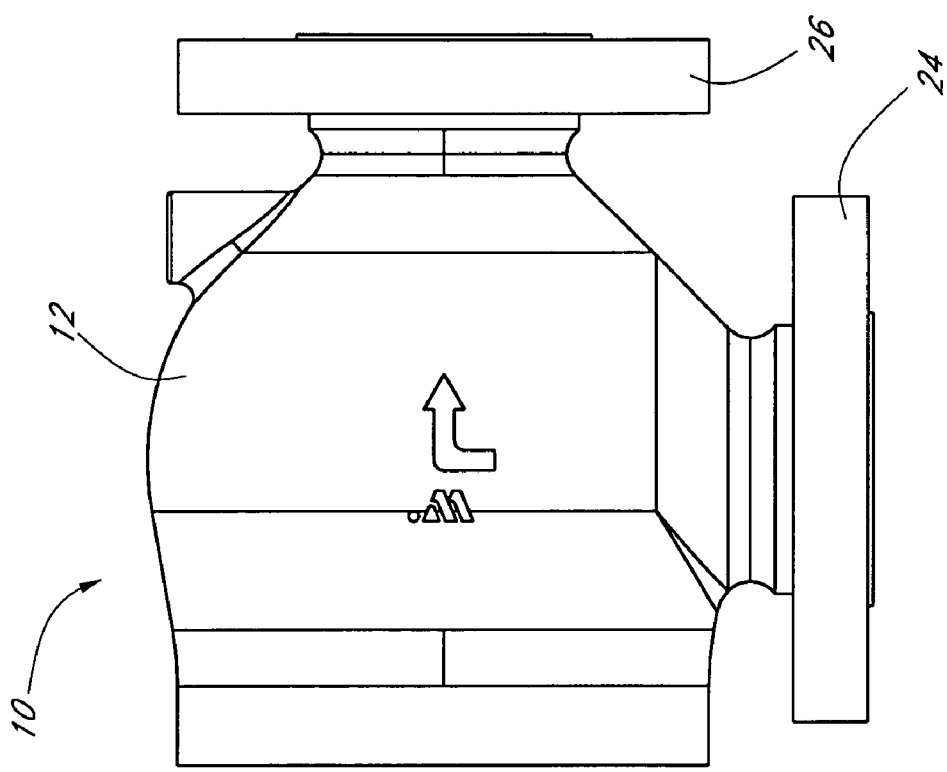
FIG. 1 is a side view of an exemplary embodiment of a control valve.
Figure 2:
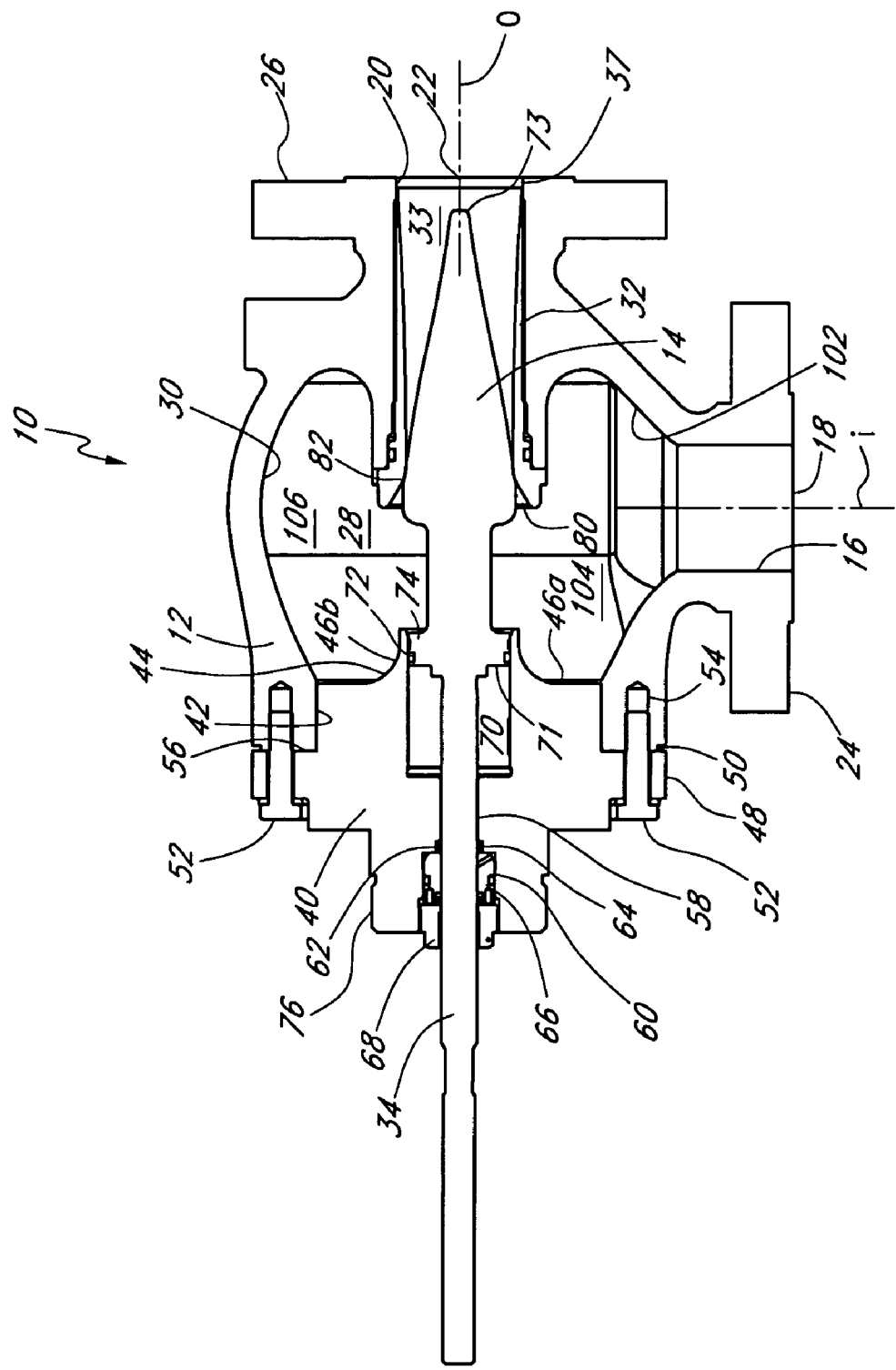
FIG. 2 is a cross-sectional side view of the control valve of FIG. 1, which shows a valve poppet and an internal valve trim.

FIG. 1 is a side view of an exemplary embodiment of a valve 10. FIG. 2 is a cross-sectional side view of the valve 10. As will be explained in detail below, the valve 10 may be used as a metering valve in a variety of industrial and commercial applications. For example, the valve 10 may be used as a metering valve for controlling the amount of fuel supplied to a gas turbine. An advantage of the exemplary embodiment is that the valve 10 provides improved pressure recovery.

As shown in FIG. 2, the valve 10 comprises a valve body 12 in which a valve poppet 14 is moveably positioned to control the amount of fluid flowing through the valve 10.

The valve body 12 comprises an inlet passage 16, which forms an inlet port 18, and an outlet passage 20, which forms an outlet port 22. In the exemplary embodiment, the valve 10 is right angle valve. That is, longitudinal axes i, o extending through the inlet and outlet ports 18, 22 are generally perpendicular to each other. This arrangement between the inlet and outlet ports 18, 22 allows the valve 10 to fit within many conventional design envelops in which it is required that the inlet and outlet ports 18, 22 be perpendicular to each other. However, it should be appreciated that in other embodiments, the longitudinal axes i, o of the inlet and outlets ports 18, 22 may be oriented at different angles with respect to each other to fit within different design envelopes.

With continued reference to FIGS. 1 and 2, the body 10 includes an inlet flange 24 and an outlet flange 26, which surround the inlet and outlet ports 18, 22 respectively. The flanges 24, 26 may be formed in any of a variety of conventional or other arrangements to facilitate a secure connection between the valve 10 and a corresponding inlet and/or outlet conduit (not shown). In one embodiment, the flanges 24, 26 are manufactured per ANSI B16.5 and are provided with raised faces that have a plurality sealing grooves to increase the contact stress with a mating component to provide a zero or near zero leak seal. For example, in one embodiment the raised faces can have three grooves, though other embodiments can have fewer or more grooves.

As shown in FIG. 2, the inlet passage 16 opens into a plenum 28, which is formed within the valve body 12 by an internal surface 30. An internal valve trim 32 is positioned at least partially within the outlet passage 20 and defines an internal passage 33, which places the plenum 28 in communication with the outlet port 22. In the illustrated embodiment, the internal valve trim 32 is in the form of a sleeve which is positioned in the outlet passage 30. The outlet passage 20 and the valve trim 32 include complementary surface structures 35a, 35b for seating the valve trim 20 within the outlet passage 30.

A seal 37 is provided between the valve trim 32 and the outlet passage 20. The internal passage 33 extends from a point upstream of the outlet passage 20 to a point downstream of the outlet port 22. As such, in the illustrated arrangement, fluid flows through from the plenum 28, through the internal passage 33 and into the outlet passage 20 to the outlet port 22. However, in modified embodiments, the internal passage 33 may form the outlet port 22 and/or begin downstream of the outlet passage 20. In the illustrated embodiment, the internal valve trim 32 is formed from a separate member than the body 12. In modified embodiments, the internal valve trim 32 or portions thereof may be formed by the body 12 or another structural component. As will be explained in more detail below, flow from the plenum 28 through the internal valve trim 32 is controlled by the valve poppet 14.

In one embodiment, the plenum 28 has a maximum cross-sectional area in a first plane that is generally perpendicular to the longitudinal axis i of the inlet port 16 that is at least about 10 greater than the cross-sectional area of the inlet port 16. In addition, the maximum cross-sectional area in the first plane is preferably at least 30 time the maximum flow area of the annulus between the poppet 14 and the seat (see below) of the internal valve trim 32. The plenum preferably also has a maximum cross-sectional area (see FIG. 3B) in a second plane that is generally perpendicular to the longitudinal axis of the valve poppet 14 that in this example is at least about 10 times greater than the cross-sectional area of the inlet port 16. In addition, the maximum cross-sectional area in the second plane is preferably at least 30 time the maximum flow area of the annulus between the poppet 14 and the seat (see below) of the internal valve trim 32. As will be explained in more detail below, the configuration of the plenum 28 helps to reduce the pressure losses as the fluid turns through the valve 10 and travels past the valve poppet 14.

Figure 3A:
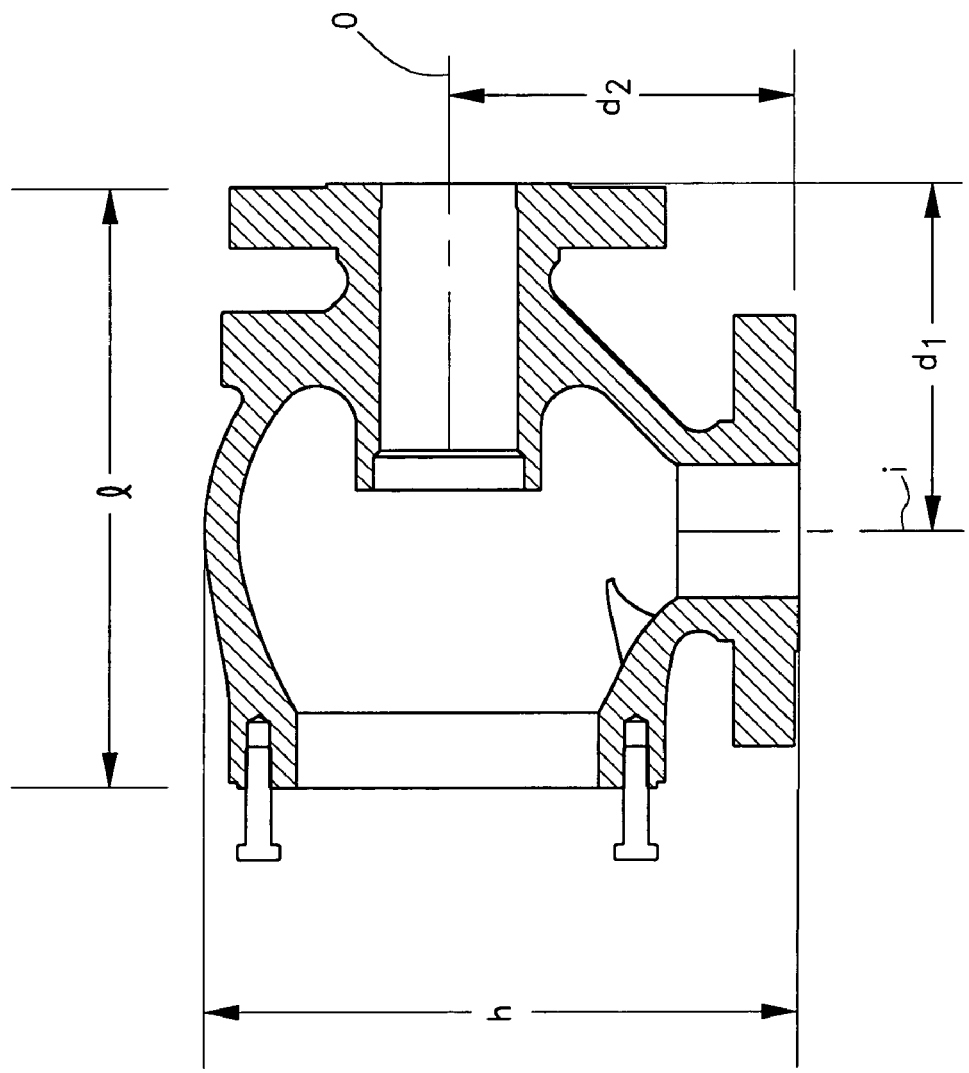
FIG. 3A is a cross-sectional side view of the control valve of FIG. 1 without the valve poppet and the internal valve trim.
Figure 3B:
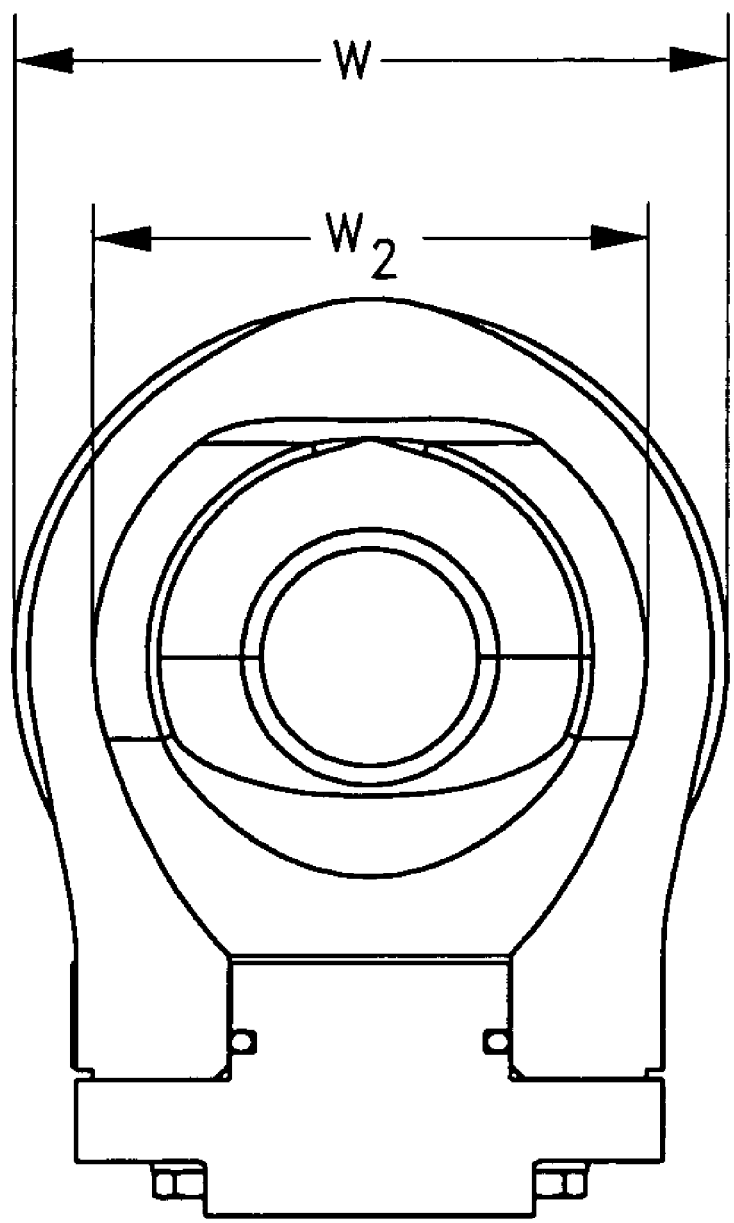
FIG. 3B is a cross-sectional view taken through line 3B—3B of FIG. 1 without the valve poppet and the internal valve trim.

In many applications, the valve 20 needs to be configured to fit within a specific design envelop. With reference to FIGS. 3A and 3B, the design envelop may specify, for example, the angular relationship between the longitudinal axes i, o of the inlet and outlet ports 18, 22, the distance d1, d2 between the inlet and outlet ports 18, 22, the height h, width w and/or length l of the valve body 12. In one specific embodiment, the valve has a height h of about 8.875 inches, a width w of about 7.250 inches, and a length l of about 9.125 inches and a depth of about 6.5 inches. In such an embodiment, the angular relationship between the longitudinal axes i, o of the inlet and outlet ports 18, 22 is about ninety degrees.

With reference back to FIG. 2, the valve poppet 14 is positioned at least partially, within the internal valve trim 32. The valve poppet 14 is coupled to or integrally formed to a valve stem 34, which in the illustrated embodiment comprises an elongated rod. In the illustrated arrangement, the proximal end of the valve poppet 14 includes a bore 36 (see FIG. 4A) with a threaded counter bore 38 for receiving the valve stem 34, which has a corresponding threaded portion (not shown). The valve stem 34 is moveably supported within a valve bonnet or casing 40.

The valve casing 40, in turn, is positioned within a valve casing opening or seat 42 that extends through the valve body 12 into the plenum 28 and is generally opposite of the outlet passage 20. When positioned in the valve seat 42, the valve casing 40 closes the plenum 28 such that, in the illustrated embodiment, an exterior front surface 44 defines a portion of the plenum 28. As will be explained in more detail below, the exterior front surface 44 defines a pair of smooth concave surfaces 46a, 46b to enlarge the volume of the plenum 28.

The valve casing 40 may be coupled to the valve body 12 in any of a variety of conventional manners. In the illustrated embodiment, the valve casing 40 includes a flange 48. The flange 48 includes a plurality of bolt holes 50, which may be arranged in any of a variety of conventional or non-conventional patterns. Bolts 52 extend through the holes and into corresponding blind holes 54 formed in the valve body 18. A seal 56 may be provided between the flange 48 and the valve body 12. In one embodiment, the seal 56 comprises a spiral crush seal or a similar sealing device.

The valve stem 34 is suitably journalled within the casing 40 for reciprocal movement. With continued reference to FIG. 2, the valve stem 34 extends through a bore 58 formed in the casing 40. The proximal end of the bore 58 forms a stem packing cavity 60 and a seal space 62. A seal 64, such as, for example, a flourogold spring/pressure loaded seal, is positioned within seal space 62 around the valve stem 34. The packing cavity 60, in turn, is filled with suitable packing material 66. A nut 68 closes the stem packaging 60 cavity such that the seal 64 may be compressed between the nut 68 and the packing material 66. Of course, those of skill in the art will recognize that any of a variety of alternative arrangements may be used for suitably journalling and sealing the valve stem 34 within the casing 40.

In the illustrated embodiment, the distal end of the bore 58 also includes a balancing cavity 70. The balancing cavity 70 is sealed by a balancing seal 72, which is positioned on an enlarged portion 74 of the valve stem 34. The enlarged portion 74 is positioned on the valve stem 34 such that throughout the stroke of the valve poppet 14 the seal lies within the valve balancing cavity 70. In this manner, the balancing cavity 70 is sealed from the plenum 28.

As is known in the art, pressure may be provided to the balancing cavity 70 to exert a force against the face 71 of the enlarged portion 74 and compensate for the imbalance created by the pressure drop across the valve poppet 14. In the illustrated embodiment, the pressure drop across the valve poppet is compensated by placing one or more balancing ports on the valve poppet 14, in the valve trim 32 and/or the outlet passage 20. In the illustrated embodiment, a balancing port 73 is provided at the tip of the valve poppet 14 and near the outlet port 22 in the outlet passage 20. In this manner, the valve 10 is slightly imbalanced such that the pressure in the valve 10 forces the valve poppet 14 into a close position.

With continued reference to FIG. 2, the proximal end of the valve casing 40 includes a boss or yoke 76. The yoke 76 may be used to support an actuator (not shown), which is coupled to the valve stem 34 and is configured to move the valve poppet 14 within the internal valve trim 32 in response to control signals. Any of a variety of actuator types may be used to actuate the valve 10, such as, for example, any of a variety of hydraulic or servomotor actuators.

Figure 4C:
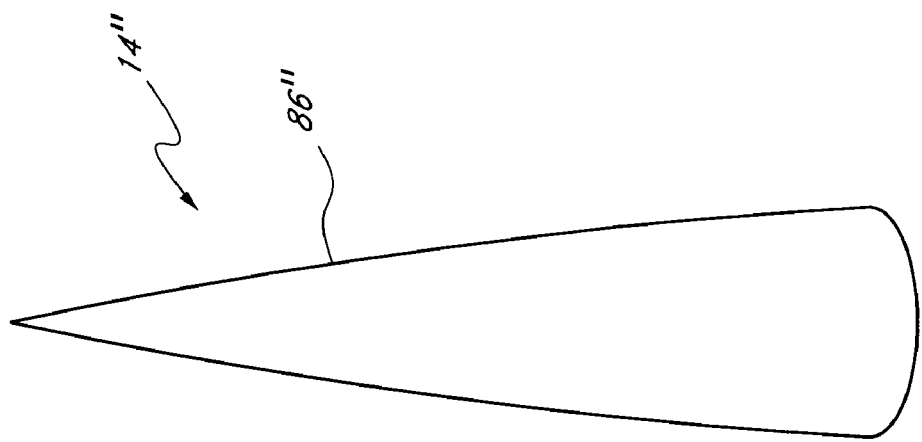
FIG. 4C is a side view of another example modified embodiment of a valve poppet.
Figure 5A:
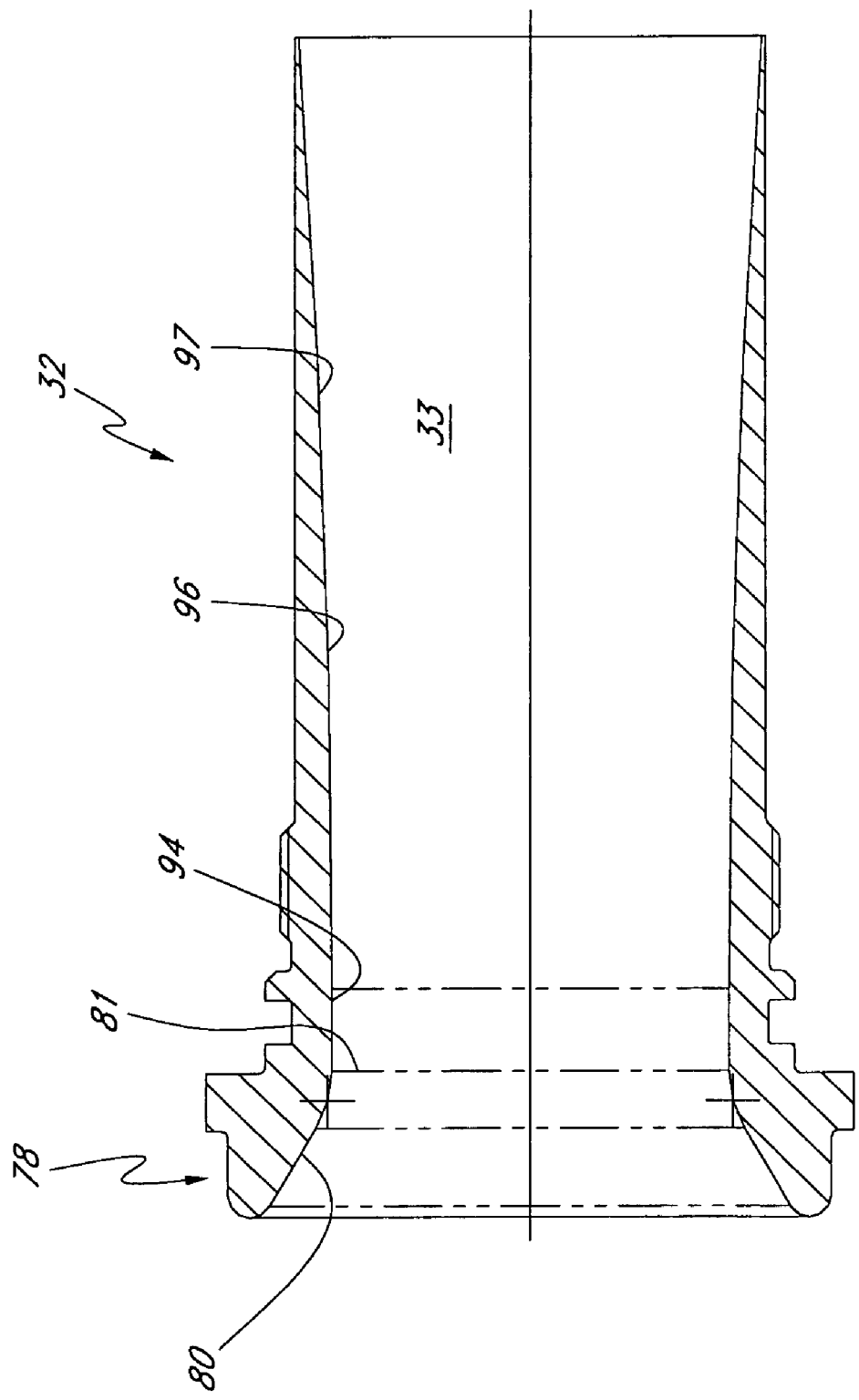
FIG. 5A is a cross-sectional side view of the example internal valve trim of FIG. 2.

The valve poppet 14 and the internal valve trim 32 will now be described in more detail with reference to FIGS. 2, 4A and 5A. The internal valve trim 32 includes a proximal end portion 78. The proximal end portion 78 defines a conical seat 80, which, in the illustrated embodiment, tapers at an angle of approximately 30 degrees with respect to the longitudinal axis of the valve poppet 14. The valve poppet 14, in turn, includes a corresponding conical portion 82 that is configured to mate with the conical seat 80. In the illustrated embodiment, the conical portion 82 tapers at an angle of approximately 15 degrees with respect to the longitudinal axis of the valve poppet 14. As seen in FIG. 2, when the valve is in a closed position, the conical portion 82 of the valve poppet 14 contacts the intersection of the conical seat 80 and the general cylindrical portion 94, which in one embodiment has a radius of approximately ⅓ of the diameter of the cylindrical portion 94 of the internal valve trim 32, to block flow from traveling through the valve 10. The valve poppet 14 and the seat 80 are preferably configured such that they are self-aligning. As mentioned above, the valve 10 is designed to be slightly imbalanced such that in the closed positioned the pressure imbalance will assist in seating the valve poppet 14 against the internal valve trim 32.

The conical valve portion 82 and the conical valve seat 80 are preferably made from materials of different hardness to form a more effective seal. For example, in one particular embodiment, the poppet 14 is made from a precipitation hardened 17-4PH stainless steel heat treated to H1100. To further promote the seal and reduce galling and wear of the poppet seat 80, the valve poppet 14 may be coated with Tribaloy T800, using a velocity-oxygenated fuel, while the valve trim 32 from the conical portion of the valve and may remain uncoated in one embodiment. This example combination produces a particularly effective sealed and in testing has qualified and passed the ANSI B16.104 Class IV leakage requirement after 100,000 endurance cycles, vibration testing and humidity. Such a seal may need about 100 lbs of force for a 1.5" diameter internal trim valve.

With reference to FIG. 4A, the poppet 14 includes a proximal portion 84, which lies proximal to the conical section 82, and a distal portion 86 which lies distal to the conical section 82. In the illustrated embodiment, the proximal portion 84 has a generally cylindrical shape with a rounded proximal edge 88. The distal portion or diffuser 86 has a tapering outer surface 90. In the exemplary embodiment, the distal portion 86 has a length measured from the distal edge of the complementary surface 80 that is preferably about two times and more preferably three times greater than average diameter of the opening 81. Over this length, the valve poppet 14 preferably tapers from a diameter at the distal edge of the complementary surface 80 to a diameter that is optionally at least 25% and more preferably at least 15% of the first diameter. The tip 92 of the valve poppet 14 is preferably rounded but in other embodiments it may be sharpened or blunt.

In the exemplary embodiment, the generally tapered distal portion 86 is characterized as having a double radius. That is, the tapered distal portion 86 the outer surface 90 is curved with respect to the longitudinal axis of the valve poppet 14 and has a concave portion 87a that transitions to a downstream convex portion 87b. In one embodiment, the concave portion 87a has a radius of approximately 27 inches and the convex portion 87b has a radius of about 22 inches. This arrangement reduces flow separation from the outer surface 90.

Figure 4B:
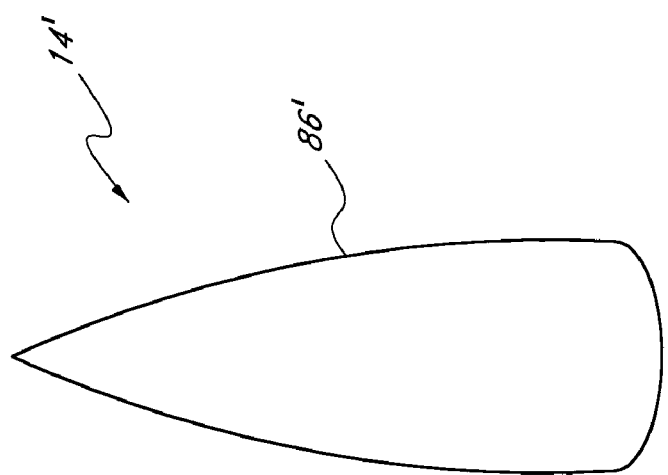
FIG. 4B is a side view of an example modified embodiment of a valve poppet.

FIG. 4B illustrates a modified embodiment of the valve poppet 14' in which the distal portion also has an outer surface 86' that is also curved with respect to the longitudinal axis of the valve poppet 14'. In this embodiment, the surface 86' is generally concave. FIG. 4C in illustrates another modified embodiment of the valve poppet 14". In this embodiment, the outer surface 86" is has a generally conical shape.

The example internal valve trim 32 will now be described in more detail with reference to FIGS. 2 and 5A. The valve trim 32 includes a generally cylindrical portion 94 immediately downstream of the opening 81 and a generally, smooth outwardly tapering surface 96 downstream of the valve seat 80. In the illustrated embodiment, the downstream portion 96 expands at angle of less than about 7 degrees thereby reducing abrupt contraction and expansion losses. The downstream portion 96 is preferably defined by a surface 97 that is curved with respect to the longitudinal axis of the internal passage 33. In the illustrated embodiment, the surface 97 is also concave with respect to the longitudinal axis of the internal passage 33. This configuration promotes higher pressure recovery by reducing and/or eliminating flow separation and discontinuities.

Figure 5B:
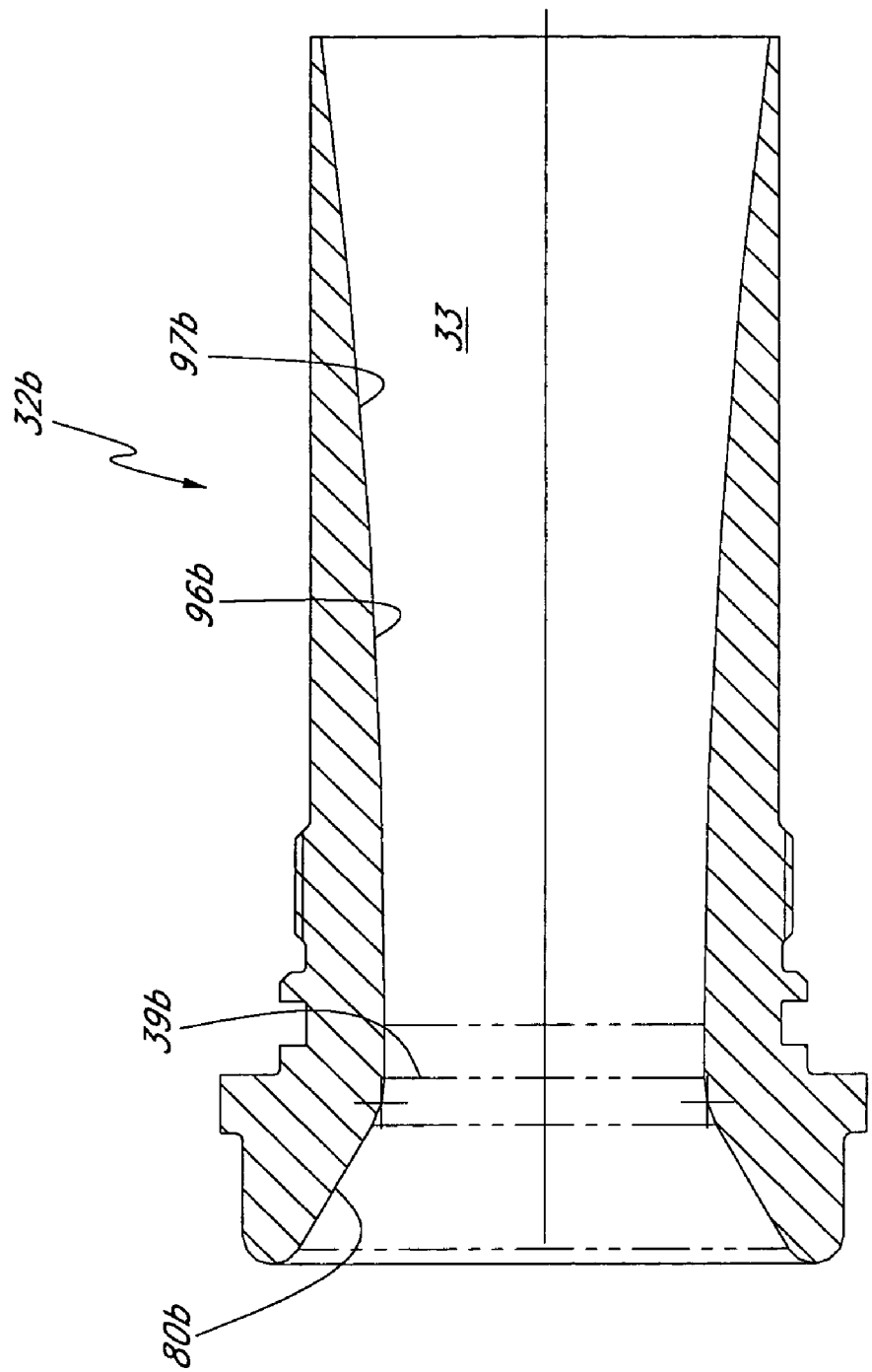
FIG. 5B is a cross-sectional side view of an example modified embodiment of an internal valve trim.
Figure 5C:
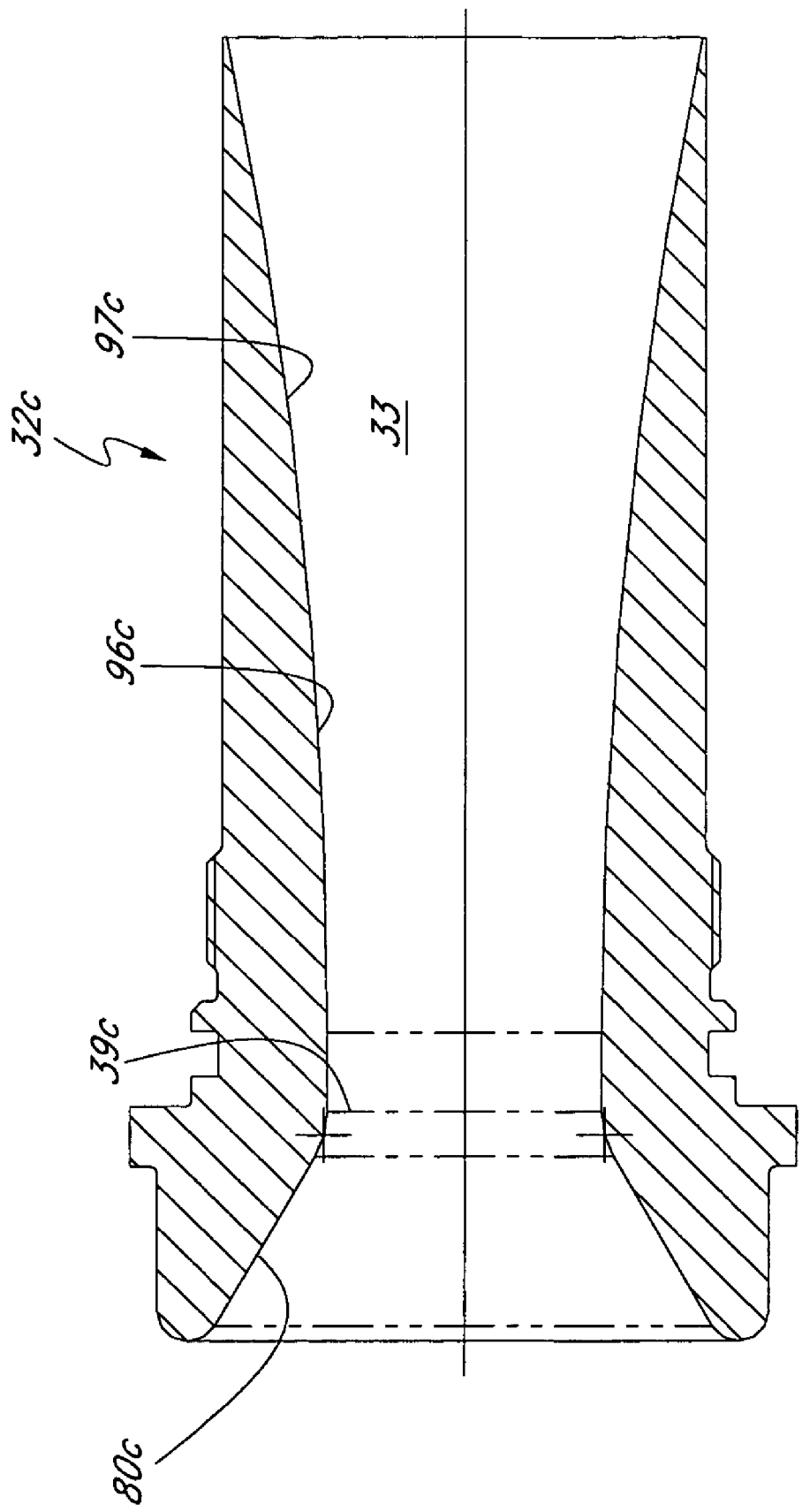
FIG. 5C is a cross-sectional side view of another example modified embodiment of an internal valve trim.
Figure 5D:
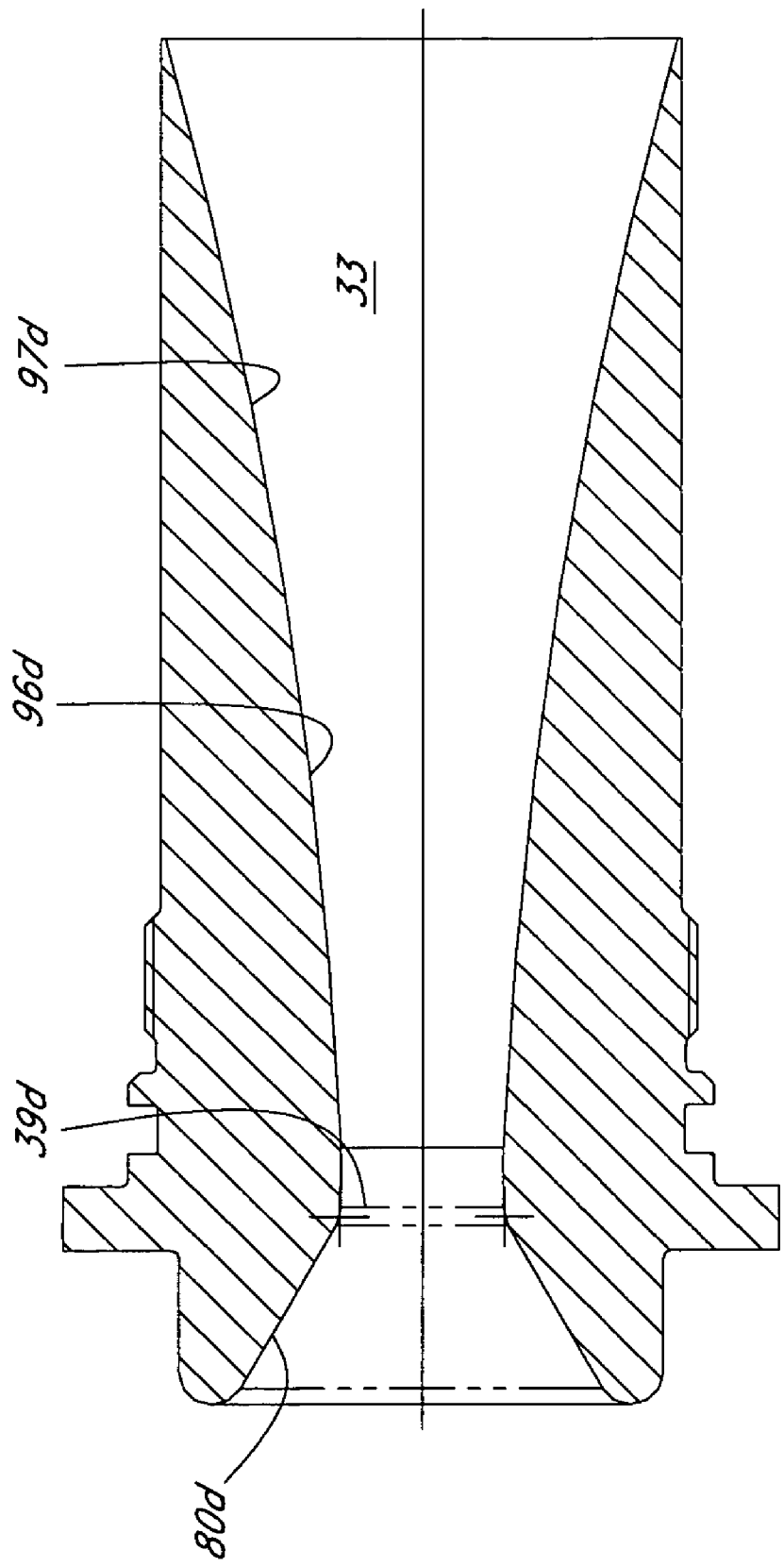
FIG. 5D is a cross-sectional side view of another example modified embodiment of an internal valve trim.

FIG. 5B illustrates a modified embodiment of the valve trim 32b. This embodiment has an opening 39b configured for a smaller range of flows than the valve trim 32 of FIG. 5A. FIG. 5C illustrates another modified embodiment of the valve trim 32c, which is configured for smaller range of flows than the valve trim 32b of FIG. 5B. FIG. 5D illustrates a modified embodiment of the valve trim 32d which is configured for a smaller range of flows than the valve trim 32c of FIG. 5C. The range of flow is reduced by decreasing the size of the opening 39b–d. As with the embodiment of FIG. 5A, each of these embodiments includes substantially cylindrical portion 94b–d and a generally expanding distal portion 96b–d. Preferably, the distal expanding portion expands 96b–d at an angle less than 7 degrees and is defined by a generally curved surface that is concave with respect to the longitudinal axis of the internal passage 33.

Figure 6:
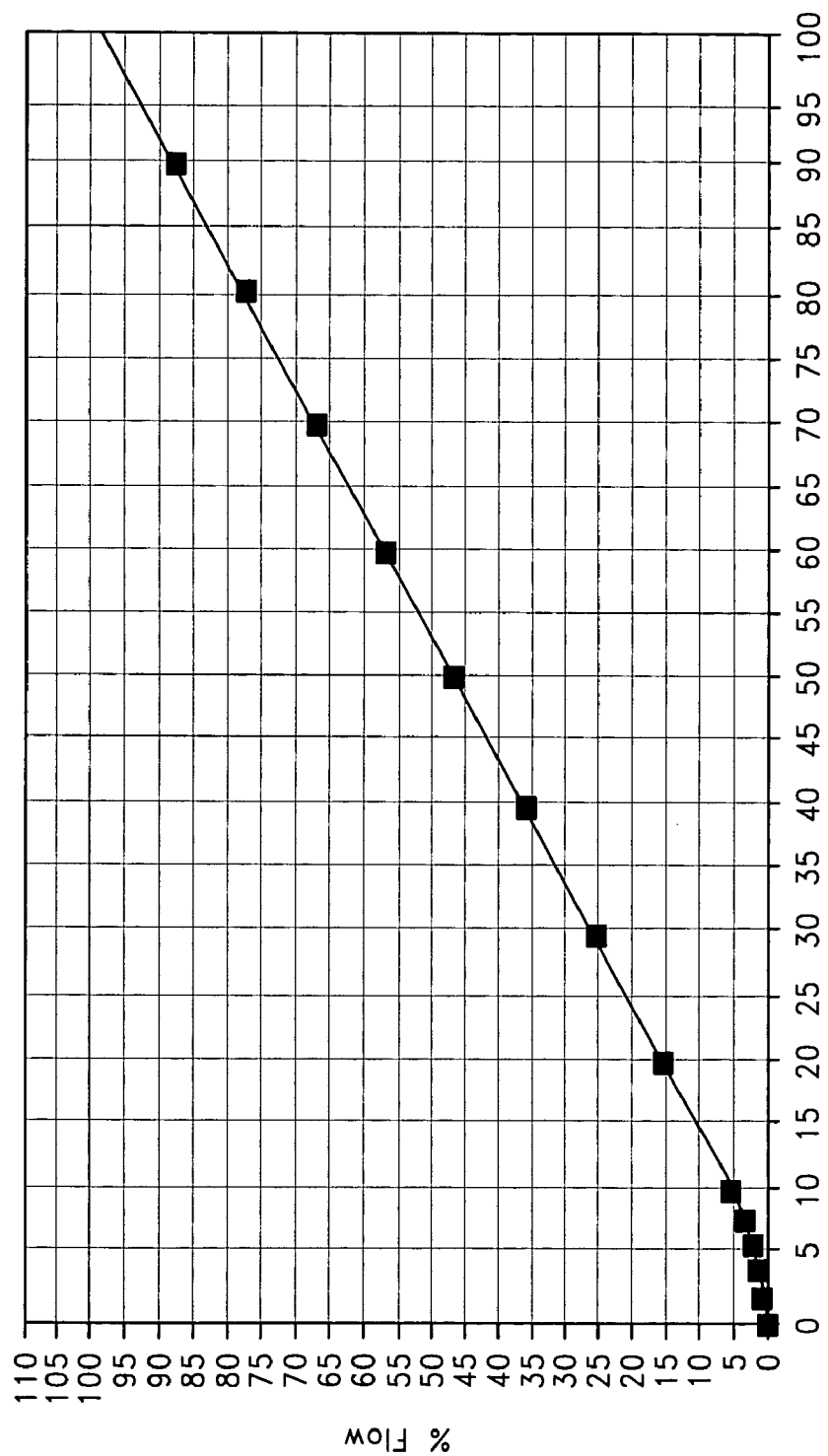
FIG. 6 is a graphical illustration of the flow of fluid through the example valve of FIG. 1 as a function of the stroke of the valve poppet.

In some embodiments, it is advantageous to provide the valve poppet 14 with a control surface 100. With reference to FIG. 4A, the control surface 100 may be located immediately downstream of the conical portion 82 and the shape of the control surface 100 may be modified to provide the valve 10 with a specific stroke versus flow curve. FIG. 6 is one example of a stroke versus flow curve. To correspond to this curve, the shape of the control surface 100 may be modified as determined through routine testing and calibration. In other embodiments, computer modeling may be used to accomplish some or all of the testing and calibration. In another embodiment, the flow versus stroke curve the valve 10 is measured and calibrated and this information is used by a controller to control the flow through the valve 10 without modifying the control surface 100.

With reference to FIG. 2, in use, the actuator (not shown) moves the valve poppet 14 in the direction of arrow A to close the valve 10. To open the valve 10 and progressively allow more fluid to pass through the valve 10 the actuator moves the valve poppet 14 in the direction of arrow B.

With reference back to FIGS. 2 and 3B, the shape of the plenum 28 will be described in more detail. In one embodiment, the downstream end of the tapered portion 102 has a diameter that is about three times the diameter of the inlet port 16 and in other embodiments about ten times the diameter of the inlet port. The tapered portion 102 transitions into a first lobe portion 104 which lies generally below the valve stem 34. A second lobe portion 106 lies above the valve stem 34.

As seen in FIGS. 3A and 3B, the first and second lobe portions 104, 106 are defined, in part, by the convex surfaces 46a, 46b of the casing such that the first and second lobe portions 104, 106 extend in a first direction that corresponds to the longitudinal axis of the valve stem 34 rearwardly beyond the seal 72. In a similar manner, the first and second lob portions 104, 106, also extend in the first direction forward of the inlet to the internal valve trim 32 and the internal valve seat 80.

With particular reference to FIG. 3B, the first and second lobes preferably have a maximum width w2 that is greater than the average diameter of the outlet port 22 and in other embodiments greater than about 3 times the average diameter of the outlet port 22.

The illustrated embodiment provides improved pressure recovery. For example, in the illustrated embodiment, the valve 10 may achieve a pressure recovery (which is defined as the total pressure measured at the inlet port 16 over the total pressure measured at the outlet port 22) of about 1.06 from 100% to 20% of the stroke of the valve poppet 14 and about 1.08 from 19% to 10% of stroke of the valve poppet 14. Similar pressure recovery improvements may be extended to angle valves with greater or less than 90 degrees and/or straight valves which incorporate some or all the features described above.

Figure 7:
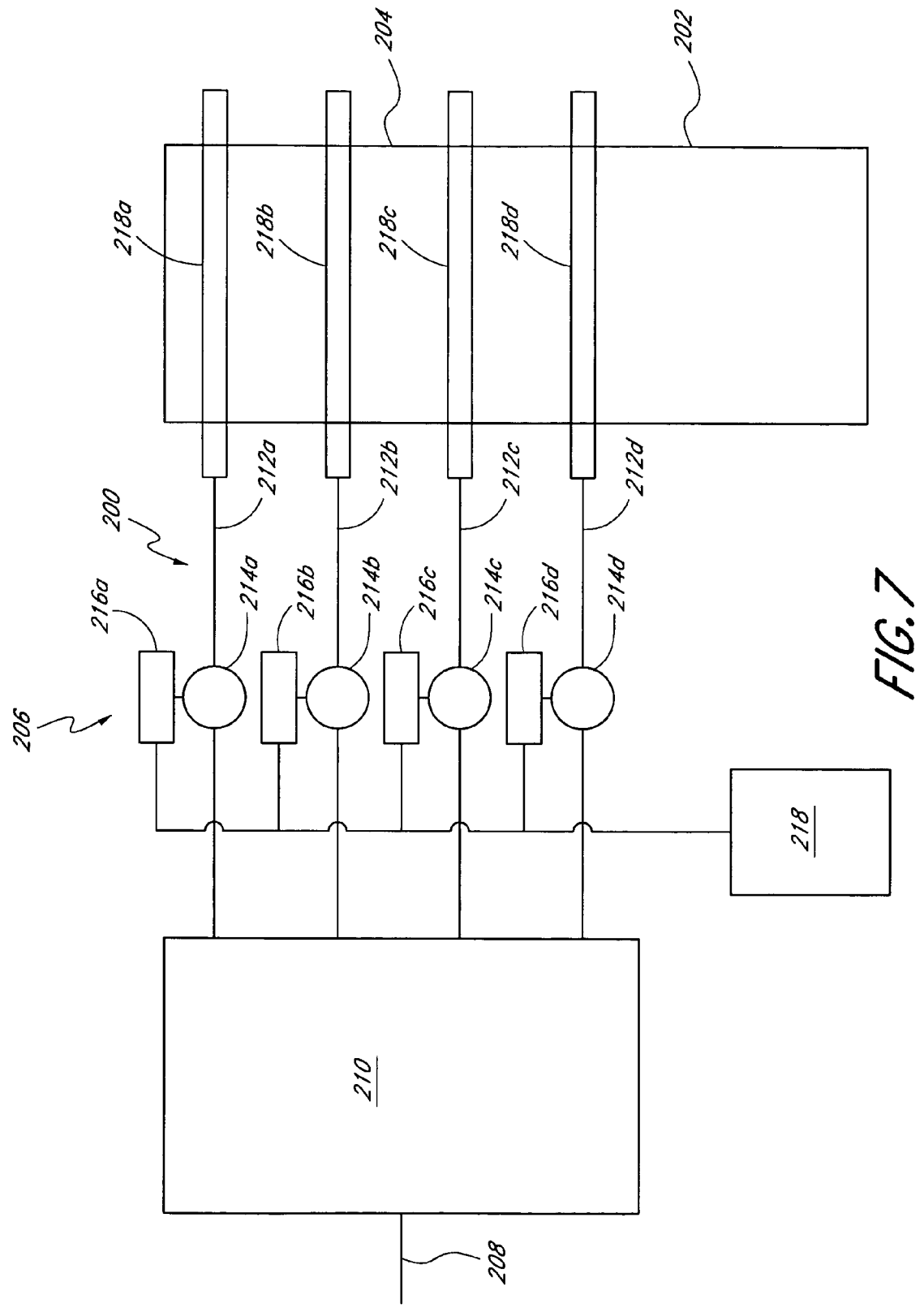
FIG. 7 is a side view of an exemplary power system.

FIG. 7 illustrates an exemplary gas turbine system 200 which includes a plurality of valves 214a–d that may be arranged as described above. The gas turbine system 200 includes a gas turbine 202, which includes a combustion chamber 204. A gas supply system 206 is provided for providing gas to the combustion chamber 204. The gas supply system 206 includes a gas main supply line 208, which is connected to a skid 210. The skid 210 is connected to four conduits 212a–d. The conduits 212a–d, in turn, are connected to manifolds 218a–d, which are connected to a fuel injection system to provide fuel to specific locations of the combustion chamber 204.

Valves 214a–d are positioned in each of the conduits 212a–d. Each valve 214a–d is provided with an actuator 216a–d, which is controlled by a suitable control system 218 for controlling the amount of fuel entering the combustion chamber. One advantage of using the valves 214a–d is that the pressure recovery is increased. As such, for a given fuel supply pressure, the combustion chamber 204 may be operated at a higher pressure because there is less pressure loss through the fuel supply system 202.

The various materials, methods and techniques described above provide a number of ways to carry out the invention. Of course, it is to be understood that not necessarily all objectives or advantages described may be achieved in accordance with any particular embodiment described herein. Thus, for example, those skilled in the art will recognize that the components of the valve may be made and the methods may be performed in a manner that achieves or optimizes one advantage or group of advantages as taught herein without necessarily achieving other objectives or advantages as may be taught or suggested herein. In addition, the present inventors contemplate the interchangeability of and recombination of various structural and method elements in the foregoing description. In addition, many of the structural elements may be combined into a single element, divided into multiple elements and/or eliminate.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above.

What is claimed is:

1. A valve comprising:
   a valve body that includes an inlet passage that forms an inlet port, an outlet passage that forms an outlet port, and a plenum;
   an internal valve trim defining an inner surface that defines an internal passage for connecting the plenum to the outlet port, the inner surface including a first surface that defines a valve seat and an opening having an average diameter; and
   a valve poppet that is moveably positioned at least partially within the internal passage, the valve poppet including an outer surface that includes a complementary surface for mating with the valve seat and substantially closing the internal passage when the valve is in a closed position, the outer surface of the valve poppet further including a distal portion located downstream of the complementary surface, the distal portion tapering from a first section having a first cross-sectional area to a second section having a second cross-sectional area, the second cross-sectional area being less than 25% of the first cross-sectional area and the second section being located a distance that is at least twice the average diameter of the opening downstream of the first section;
   wherein the distal portion of the valve poppet is defined by an outer surface that curves with respect to a longitudinal axis of the valve poppet, the outer surface including a convex portion and a concave portion and wherein the convex portion is located downstream of the concave portion.

2. The valve of claim 1, wherein the valve provides a pressure recovery of 1.06 over a majority of the valve poppet stroke.

3. The valve of claim 1, wherein the valve provides a pressure recovery of 1.06 from 100% to 20% of the valve poppet stroke.

4. The valve of claim 1, wherein the inlet port defines a first longitudinal axis and the outlet port defines a second longitudinal axis and the first longitudinal axis and the second longitudinal axis are not parallel to each other.

5. The valve of claim 1, wherein the inlet port defines a first longitudinal axis and the outlet port defines a second longitudinal axis and the first longitudinal axis and the second longitudinal axis are orientated about 90 degrees with respect to each other.

6. The valve of claim 1, wherein the complementary surface of the valve poppet seat forms a conical surface that is angled.

7. The valve of claim 1, wherein the complementary surface of the valve poppet seat forms a conical surface that is angled at about 15 degrees with respect to a longitudinal axis of the valve poppet.

8. The valve of claim 1, wherein the valve seat forms a conical surface that is angled.

9. The valve of claim 1, wherein the valve seat forms a conical surface that is angled at about 30 degrees with respect to a longitudinal axis of the internal passage.

10. The valve of claim 1, wherein the inlet port defines a first longitudinal axis and the outlet port defines a second longitudinal and wherein the inlet port has a cross-sectional area and the plenum has a maximum cross-sectional area in a plane perpendicular to the first longitudinal axis that is at least 10 times greater than the cross-sectional area of the inlet port.

11. The valve of claim 1, wherein the inlet port defines a first longitudinal axis and the outlet port defines a second longitudinal axis and wherein the inlet port has a cross-sectional area and the plenum has a maximum cross-sectional area in a plane perpendicular to the first longitudinal axis that is at least 30 times greater than the maximum cross-sectional area between the valve poppet and the internal valve seat at 100% open.

12. The valve of claim 1, wherein the inlet port defines a first longitudinal axis and the outlet port defines a second longitudinal axis and wherein the inlet port has a cross-sectional area and the plenum has a maximum cross-sectional area in a plane perpendicular to the second longitudinal axis that is at least 10 times greater than the cross-sectional area of the inlet port.

13. The valve of claim 1, wherein the inlet port defines a first longitudinal axis and the outlet port defines a second longitudinal axis and wherein the inlet port has a cross-sectional area and the plenum has a maximum cross-sectional area in a plane perpendicular to the second longitudinal axis that is at least 30 times greater than the maximum cross-sectional area between the valve poppet and the internal valve seat at 100% open.

14. The valve of claim 1, wherein the internal passage of the internal valve trim includes a expansion portion that tapers at an angle less than 7 degrees.

15. The valve of claim 13, wherein the expansion portion is defined by a surface that is curved with respect to a longitudinal axis of the internal passage.

16. A valve comprising:

a valve body that includes an inlet passage that forms an inlet port, an outlet passage that forms an outlet port, and a plenum;

an internal valve trim defining an inner surface that defines an internal passage for connecting the plenum to the outlet port, the inner surface including a first surface that defines a valve seat and an opening having an average diameter; and a valve poppet that is moveably positioned at least partially within the internal passage, the valve poppet including an outer surface that includes a complementary surface for mating with the valve seat and substantially closing the internal passage when the valve is in a closed position, the outer surface of the valve poppet further including a distal portion located downstream of the complementary surface, the distal portion tapering from a first section having a first cross-sectional area to a second section having a second cross-sectional area, the second cross-sectional area being less than 25% of the first cross-sectional area and the second section being located a distance that is at least twice the average diameter of the opening downstream of the first section;

wherein the internal passage of the internal valve trim includes a expansion portion that tapers at an angle less than 7 degrees, the expansion portion being defined by a surface that is curved with respect to a longitudinal axis of the internal passage, wherein the surface of the expansion portion is concave.

17. A valve comprising:

a valve body that includes an inlet passage that forms an inlet port, an outlet passage that forms an outlet port, a plenum in fluid communication with the inlet and outlet port, wherein the inlet port defines a first longitudinal axis and the outlet port defines a second longitudinal axis that is orientated about ninety degrees with respect to the first longitudinal axis;

an internal valve trim defining an inner surface that defines an internal passage for connecting the plenum to the outlet port, the inner surface including a first surface that defines a valve seat and a second surface for defining a diffuser, the second surface being curved along a longitudinal axis of the internal passage and being concave with respect to the longitudinal axis of the internal passage; and a valve poppet that is moveably positioned at least partially within the internal passage, the valve poppet including an outer surface that includes a complementary surface for mating with the valve seat and substantially closing the internal passage when the valve is in a closed position, the outer surface of the valve poppet further including a distal portion located downstream of the complementary surface and having a generally tapered shape.

* * * * *